United States Patent [15] 3,636,280
Wetzel [45] Jan. 18, 1972

[54] TELEPHONE LINE TESTING FROM REMOTE LOCATIONS

[72] Inventor: Louis Emery Wetzel, Santa Monica, Calif.
[73] Assignee: General Telephone Company of California, Santa Monica, Calif.
[22] Filed: Sept. 17, 1970
[21] Appl. No.: 73,122

[52] U.S. Cl. ....179/175.3
[51] Int. Cl. ....H04b 3/46
[58] Field of Search ....179/175.3, 175.31 R, 2 A; 324/95, 52

[56] References Cited

UNITED STATES PATENTS 1,699,415 1/1929 Wetzel....179/175.3
3,417,210 12/1968 Chapin....179/175.3

*Primary Examiner*—Kathleen H. Claffy
*Assistant Examiner*—Douglas W. Olms
*Attorney*—Pastoriza and Kelly

[57] ABSTRACT

Telephone line testing from a remote location such as a testing facility is accomplished by providing a disconnect switch at the interface connection of the line to suitable customer equipment. A known impedance is provided at the interface connection point such that by passing a signal from the testing facility to the interface connection point the switch will disconnect the customer equipment and connect into the circuit the known impedance. Tests may then be made by passing current down the telephone line from the testing facility to the interface point, any failure to measure the known impedance indicating that trouble exists between the testing facility and the interface connection point. In this event, the customer need not be bothered by telephone men in effecting repairs. If the telephone line shows proper continuity between the testing facility and the interface connection point, it is then known that the customer's equipment is causing the trouble. The equipment can then properly be repaired by telephone men if authorized by the customer or by the customer himself.

4 Claims, 2 Drawing Figures

INVENTOR.
LOUIS EMERY WETZEL
BY
Pastoriza & Kelly
ATTORNEYS

TELEPHONE LINE TESTING FROM REMOTE LOCATIONS

This invention relates generally to telephone testing and more particularly to a method and means for isolating trouble in a telephone line between a testing facility and an interface connection point to customer equipment, and the customer equipment itself.

BACKGROUND OF THE INVENTION

Telephone lines to customer equipment normally extend from a testing facility such as a central office, for example, to an interface connection point usually close to or on the customer's premises. It is at this point that the telephone line connects to the customer equipment. In many instances this customer equipment may be customer owned and maintained type equipment (COAM). In less frequent instances, the customer equipment may be a conventional residential telephone.

In either of the above instances, when trouble occurs in the telephone line such trouble necessarily either exists between the testing facility or central office, as the case may be, and the interface connection point, or, in the customer equipment on the premises. In the latter case, it is necessary for telephone men to enter the customer's premises and test the equipment or make necessary repairs or, alternatively, for the customer himself to effect such repairs if he owns the equipment. If the trouble is in the former location between the testing facility and interconnection point, the repair can be effected without disturbing the customer.

Clearly, it would be desirable if the telephone company could determine in advance the location of the trouble. If the trouble existed between the testing facility and interface connection point, proper repairs could be made without disturbing the customer in any way. On the other hand, if the trouble occurs in the customer equipment, if such equipment is owned by the customer, it is his responsibility to effect the repairs. To minimize disturbing customers, it is desirable that the telephone company determine in advance the location of the trouble. Moreover, such determination in many instances will avoid the necessity of a repair crew making a trip to the customer's premises.

BRIEF DESCRIPTION OF THE PRESENT INVENTION

With the foregoing in mind, the present invention contemplates a method and apparatus for determining whether trouble in a telephone line exists between a testing facility and the interface connection point to customer equipment or, alternatively, in the customer equipment itself. This determination can be made from a remote location such as the testing facility or central office.

In accord with the invention, a known electrical load impedance is provided at the interface connection point where the telephone line connects to the customer equipment. A signal-responsive switch means in turn is connected to the telephone line such that when a control signal is received from the testing facility or central station the switch will disconnect the telephone line at the interface connection point from the customer equipment and connect the telephone line to the known electrical impedance. In the preferred embodiment of the invention, the switch means includes a time delay such that the disconnection from the customer's equipment and connection to the known impedance will be maintained for a given length of time after which such reconnection will be established between the telephone line and the customer equipment.

During the given period time that the impedance is connected to the end of the telephone line, a testing signal may be sent down the telephone line from the testing facility and the known impedance measured. If there is no trouble in the telephone line circuit between the testing facility and the interface connection point, a proper impedance will be measured. On the other hand, if the trouble exists between the testing facility and interface connection point no continuity will be detected or, alternatively, a short circuit will be detected by failure to measure the proper known impedance at the end of the line.

In the event that there is proper continuity and a proper impedance is measured, the telephone repair crew will know at once that the trouble exists in the customer equipment or at some point between the interface connection point and the particular equipment involved; that is, the trouble is on the customer's premises. On the other hand, if the proper impedance is not measured or a short or open circuit is indicated, the telephone repair crew will know that the trouble exists between the testing facility and the interface connection point and such repairs can be effected without disturbing the customer.

In rare instances it is possible that trouble may exist at both locations. In this case, however, after the telephone line has been repaired between the testing facility and interface connection point, a second testing of the line by the testing signal from the remote location will then indicate that the complaint of trouble now exists in the customer equipment.

BRIEF DESCRIPTION OF THE DRAWINGS

A better understanding of the invention will be had by now referring to the accompanying drawings, in which.

DETAILED DESCRIPTION OF THE INVENTION

Figure 1:
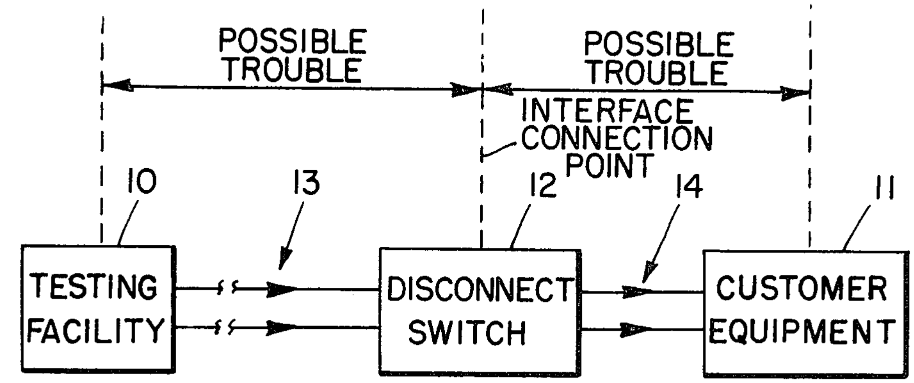
FIG. 1 is a simplified block diagram of a telephone line system connected to customer equipment wherein the present invention may be utilized; and, FIG. 2 is a more detailed circuit diagram of one means for carrying out the method of the invention.

Referring to FIG. 1 there is illustrated a telephone testing facility 10 which might, for example, be a central office. At the right of the diagram there is indicated by the block 11 customer owned and maintained equipment. In certain instances, as mentioned heretofore, this equipment may constitute a conventional residential telephone. Moreoften, however, the equipment constitutes business equipment utilizing telephone lines such as computers and the like. In either event, the telephone line from the testing facility extends to an interface connection point at or near the customer's premises where connections are made to the customer's equipment.

In accord with the invention, there is provided at this interface connection point a disconnect switch indicated by the block 12 for enabling testing of the telephone line from the testing facility 10. Thus there are shown telephone lines 13 between the testing facility and the interface connection point where the disconnect switch 12 is located and further telephone circuitry 14 connecting to the customer owned and maintained (COAM) equipment 11. If the equipment is not operating; that is, if there is trouble in the telephone line, this trouble could exist between the testing facility 10 and the interface connection point or between the interface connection point and the customer owned and maintained equipment 11 or possibly in the equipment itself.

The manner in which the trouble is isolated in accord with the invention will now be described in detail with respect to FIG. 2. As shown, the telephone line 13 from the testing facility includes two lines L1 and L2 terminating in switch arms 15 constituting part of the switch 12 described in FIG. 1. A relay coil 16, by way of example, is used to operate the switch arms 15 simultaneously, energization of the relay coil 16 taking place by a suitable signal from a time delay network 17. This network 17 is supplied with a control signal through branch leads from the lines L1 and L2, each of these branch leads including a diode D1 and D2 as shown. One end of the relay coil 16 is grounded and the other end is provided with a signal for a given length of time from the time delay 17.

The switch arms 15 when operated by the relay coil 16 disconnect from the telephone line 14 to the customer equipment at the interface connection point and make contact with terminals 18 and 19 to thereby connect to the lines L1 and L2 a given known electrical load impedance 20. By way of example, this impedance may comprise a resistance R and a capacitor C in series. After a given length of time, the signal from the time delay 17 terminates so that the switch arms 15 return to their normal position to connect the lines L1 and L2 to the lines 14 and thus to the customer equipment. When the switch is thrown to the terminals 18 and 19, during the period that the switch is held in this position, test equipment indicated by the block 21 is utilized to pass testing signals down the line L1 and L2.

OPERATION

Figure 2:
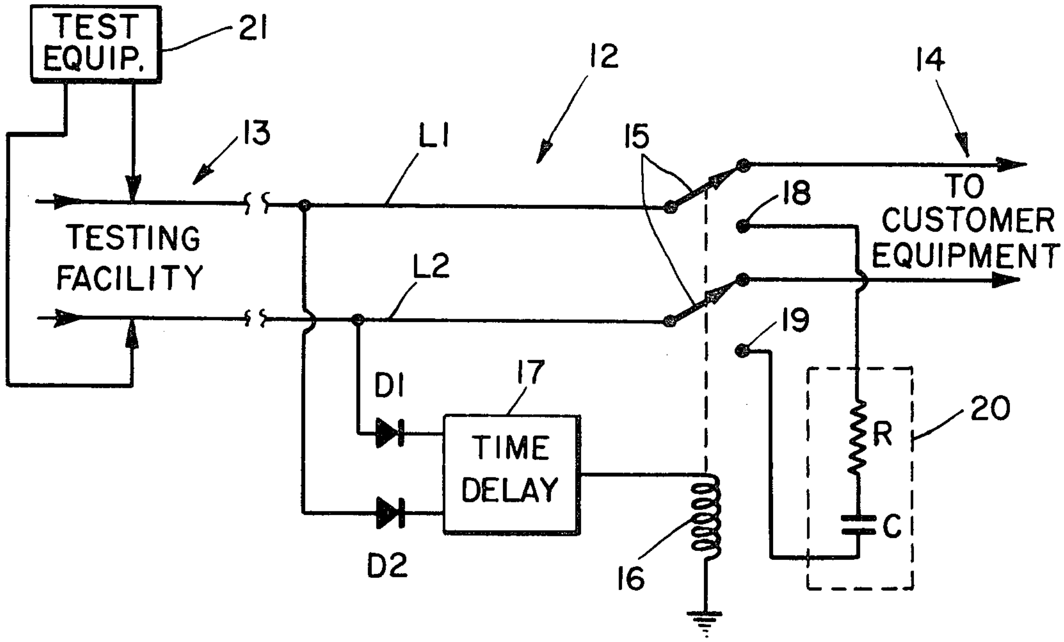

In operation, and with reference to FIG. 2, the switch arms 15 are normally in the position shown so that the telephone lines L1 and L2 are connected directly to the customer equipment. Normal information signals down the line L1 and L2 are not of sufficient power to in any way operate the time delay 17 and relay coil 16. The customer equipment can thus be operated normally.

If trouble occurs such that the customer cannot operate his equipment, the telephone repair crew can immediately isolate the trouble from the testing facility by passing a control signal down the lines L1 and L2. As an example, this control signal might be a DC 130-volt signal. This signal will pass into the time delay 17 and result in a sustained current from the time delay for a given period of time through the relay coil 16. The switch arms 15 will then disconnect from the customer equipment and connect to the terminals 18 and 19 so that the impedance 20 is now connected across the lines L1 and L2. Thereafter, the repair crew will send testing signals down the lines L1 and L2 and measure the impedance between the lines. If the impedance corresponds to the known impedance 20, it is immediately evident that the lines L1 and L2 are operating normally. However, should the impedance be different, it will be evident that there is either a short circuit, partial short circuit, or open circuit. For example, if an infinite impedance is indicated, it will be clear that either the lines L1, L2, or both are open circuited.

It is also possible for each individual line to be tested by operating the time delay and relay coil by means of the 130-volt DC signal applied between either line L1 or L2 and ground. If the continuity of lines L1 and L2 is complete, the relay coil 16 should operate to connect the impedance to the lines so that the initially described tests can be conducted.

The time delay 17 operates to hold the switch arms 15 on the terminals 18 and 19 a sufficient length of time to permit a necessary test to be carried out. This length of time may vary between 5 and 15 seconds. Thereafter, the switch arms 15 will return to their normal position.

If proper continuity is maintained in the lines during the test period and the proper impedance is measured across the lines corresponding to the known impedance 20, the telephone crew will be advised immediately that the trouble exists in the line 14 to the customer equipment or in the customer equipment itself. They can then advise the customer to effect repairs or, in the case of a residential telephone, the telephone people can then confine their work to wiring on the premises.

On the other hand, if an incorrect impedance is measured during the time that the switch arms 15 are connected to the impedance 20, or if a lack of continuity is indicated, the telephone repair crew will then know that the trouble includes the lines L1 and L2 between the testing facility and interface connection point to the customer equipment. Repairs can then be effected at this location without in any way disturbing the customer.

From the foregoing description, it will thus be evident that the present invention has provided a greatly improved method and means for quickly locating trouble in telephone lines thereby avoiding the inconvenience of unnecessary trips to a customer's premises should the trouble occur in the telephone lines between the testing facility or central office and interconnection point.

What is claimed is:

1. A method for determining whether trouble in a telephone line exists between a testing facility and the interface connection point to customer equipment or in the customer equipment itself, comprising the steps of:
   a. providing a known load impedance at said interface connection point;
   b. providing a signal-responsive switch at said interface connection point responsive to a control signal from the testing facility to disconnect the telephone line at the interface connection point from the customer equipment and reconnect it to said known impedance;
   c. passing a control signal down the telephone line from the testing facility to the interface connection point to operate said signal-responsive switch; and
   d. measuring any signal in the line passing through the known impedance to thereby provide an indication if the line between the testing facility and interface connection point is operative, failure to measure any signal in the line indicating that the trouble is in the line between the testing facility and interface connection point and measurement of a proper signal indicating that the trouble is in the customer equipment.

2. A means for determining whether trouble in a telephone line exists between a testing facility and the interface connection point to customer equipment or in the customer equipment itself, comprising, in combination:
   a. a given electrical impedance at said interface connection point;
   b. switch means responsive to a control signal on said telephone line from said testing facility for disconnecting said telephone line from the customer equipment and connecting it to said given electrical impedance for a given length of time; and,
   c. means for passing a testing signal down said telephone line from said testing facility to said electrical impedance so that the continuity of the line between said testing facility and interface connection point can be checked whereby if there is no continuity it is known that trouble in the line exists between the testing facility and customer equipment whereas if there is continuity, it is known that trouble is in the customer equipment.

3. The subject matter of claim 2, in which said switch means includes a time delay means responsive to said control signal to hold said switch in its switched position in which the telephone line to the customer equipment is disconnected and said electrical impedance is connected for said given length of time, said switch means returning to its initial position to disconnect the impedance and reconnect the line to the customer equipment at the end of said given period.

4. The subject matter of claim 3, in which the telephone line comprises a two-wire line from said testing facility terminating in switch arms normally connected to the customer equipment, said switch means including said two-switch arms and a relay coil for simultaneously disconnecting said switch arms from said customer equipment and connecting them to said electrical impedance, one end of said relay coil being grounded; and branch leads from said two-wire line, each including a diode connecting to said time delay means, the output of said time delay means connecting to the other end of said relay coil and being responsive to the control signal passed through either diode to energize said coil for a sustained period corresponding to said given length of time so that test signals may be applied between either of said two lines and ground to energize said relay coil and enable testing of each individual line.

* * * * *